United States Patent Office 2,974,172
Patented Mar. 7, 1961

2,974,172

PREPARATION OF AROMATIC KETONES

John P. Luvisi, Park Ridge, Ill., assignor, by mesne assignments, to Universal Oil Products Company, Des Plaines, Ill., a corporation of Delaware No Drawing. Filed Nov. 27, 1957, Ser. No. 699,152

10 Claims. (Cl. 260—592)

This invention relates to a process for preparing aromatic oxygenated compounds and more particularly to a method of preparing aromatic ketones.

An object of this invention is to prepare aromatic oxygenated compounds by reacting an aromatic compound with a nitrile and hydrolyzing the resultant imine.

One embodiment of this invention is found in a process for preparing an aromatic ketone by reacting a lower alkyl benzene hydrocarbon with an alkane nitrile in the presence of a Friedel-Crafts type catalyst and anhydrous hydrogen chloride, treating the resultant compound with a basic compound, and recovering the resultant aromatic ketone.

A specific embodiment of the invention is found in a process for the preparation of an aromatic ketone which comprises reacting a lower alkyl benzene hydrocarbon with an alkane nitrile in the presence of aluminum chloride and anhydrous hydrogen chloride at a temperature in the range of from about 0° to about 200° C., hydrolyzing the resultant imine hydrochloride with a basic compound, and recovering the resultant aromatic compound. A more specific embodiment of the invention is found in a process for the preparation of an aromatic ketone which comprises reacting o-xylene with an acetonitrile in the presence of aluminum chloride and an anhydrous hydrogen chloride at a temperature in the range of from about 0° to about 150° C., hydrolyzing the resultant imine hydrochloride with sodium hydroxide, and recovering the resultant 3',4'-dimethylacetophenone.

Other objects and embodiments referring to alternative aromatic compounds, alternative catalyst and alternative basic compounds will be found in the following further detailed description of the invention.

It has now been discovered that aromatic oxygenated compounds and in particular aromatic ketones may be prepared by reacting an aromatic compound with a nitrile in the presence of a Friedel-Crafts type catalyst and anhydrous hydrogen chloride and hydrolyzing the resultant imine hydrochloride with a basic compound to prepare the desired ketone. These ketones may be used as intermediates in the preparation of other organic compounds. For example, acetophenone or 3,4-dimethylacetophenone may be oxidized to the corresponding acid, which then may be used in the preparation of plastics. For purposes of this invention the term "aromatic compound" will include both aromatic hydrocarbons and aromatic hydrocarbons having an inert substituent other than an alkyl group, on the nucleus, such as a halogen.

Examples of these compounds which may be used in the present invention include benzene, toluene, o-xylene, m-xylene, p-xylene, ethylbenzene, o-diethylbenzene, m-diethylbenzene, p-diethylbenzene, propylbenzene, 1,3,5-trimethylbenzene, 1,3,5-triethylbenzene, chlorobenzene, bromobenzene, o-chlorotoluene, m-chlorotoluene, p-chlorotoluene, o-bromotoluene, m-bromotoluene, p-bromotoluene, o-chloroethylbenzene, m-chloroethylbenzene, p-chloroethylbenzene, o-bromomethylbenzene, m-bromoethylbenzene, p-bromoethylbenzene, o-chloropropylbenzene, m-chloropropylbenzene, p-chloropropylbenzene, o-bromopropylbenzene, m-bromopropylbenzene, p-bromopropylbenzene, o-chlorobutylbenzene, m-chlorobutylbenzene, p-chlorobutylbenzene, o-bromobutylbenzene, m-bromobutylbenzene, p-bromobutylbenzene, etc. It is also contemplated within the scope of this invention that polynuclear aromatic hydrocarbons such as 1-methylnaphthalene, 2-methylnaphthalene, 1-ethylnaphthalene, 2-ethylnaphthalene, 1,2-dimethylnaphthalene, 1,2-diethylnaphthalene, 1,4-dimethylnaphthalene, 1,4-diethylnaphthalene, 1-methyl-2-chloronaphthalene, 1-methyl-2-bromonaphthalene, 1-ethyl-2-chloronaphthalene, 1-ethyl-2-bromonaphthalene, 1 - methyl - 4 - chloronaphthalene, 1-ethyl-4-chloronaphthalene, 1 - methyl-4-bromonaphthalene, 1-ethyl-4-bromonaphthalene, 1,2-dichloronaphthalene, 1,2-dibromonaphthalene, 1-methylphenanthrene, 2-methylphenanthrene, 4-methylphenanthrene, 1-ethylphenanthrene, 2 - ethylphenanthrene, 4 - ethylphenanthrene, 1,2-dimethylphenanthrene, 1,2-diethylphenanthrene, 1,4-dimethylphenanthrene, 1,4-diethylphenanthrene, 1-chlorophenanthrene, 1 - bromophenanthrene, 4 - chlorophenanthrene, 4-bromophenanthrene, 1-methyl-2-chlorophenanthrene, 1-methyl-4-chlorophenanthrene, 1-ethyl-2-chlorophenanthrene, 1-ethyl-4-chlorophenanthrene, etc., 1-methylanthracene, 2-methylanthracene, 4-methylanthracene, 1-ethylanthracene, 2-ethylanthracene, 4-ethylanthracene, 1,2 - dimethylanthracene, 1,2 - diethylanthracene, 1,4-dimethylanthracene, 1,4-diethylanthracene, 1-chloroanthracene, 1-bromoanthracene, 4-chloroanthracene, 4-bromoanthracene, 1-methyl - 2 - chloroanthracene, 1-methyl-4-chloroanthracene, 1-ethyl-2-chloroanthracene, 1-ethyl-4-chloroanthracene, etc., 1-methylchrysene, 2-methylchrysene, 4-methylchrysene, 1-ethylchrysene, 2-ethylchrysene, 4-ethylchrysene, 1,2-dimethylchrysene, 1,2-diethylchrysene, 1,4-dimethylchrysene, 1,4-diethylchrysene, 1-chlorochrysene, 1-bromochrysene, 4-chlorochrysene, 4-bromochrysene, 1-methyl-2-chlorochrysene, 1-methyl-4-chlorochrysene, 1-ethyl-2-chlorochrysene, 1-ethyl-4-chlorochrysene, etc., 1-methylpyrene, 2-methylpyrene, 4-methylpyrene, 1-ethylpyrene, 2-ethylpyrene, 4-ethylpyrene, 1,2-dimethylpyrene, 1,2-diethylpyrene, 1,4-dimethylpyrene, 1,4-diethylpyrene, 1-chloropyrene, 1-bromopyrene, 4-chloropyrene, 4-bromopyrene, 1-methyl-2-chloropyrene, 1-methyl-4-chloropyrene, 1-ethyl-2-chloropyrene, 1-ethyl-4-chloropyrene, etc., although not necessarily with equivalent results.

Nitriles which may be used include acetonitrile, propionitrile, butyronitrile, valeric nitrile, capronitrile, hexylnitrile, caprylonitrile, pelargonic nitrile, capric nitrile, etc. It is to be understood that the aforementioned aromatic compounds and nitriles are only representatives of the class of compounds which may be used and that the present invention is not necessarily limited thereto.

The action between the aromatic compound and the nitrile is effected in the presence of certain Friedel-Crafts type catalysts and anhydrous hydrogen chloride. Metal halide or Friedel-Crafts type catalyts which may be used include aluminum chloride, ferric chloride, zirconium chloride, zinc chloride and boron trifluoride. For purposes of this invention boron trifluoride is treated as a metal halide although technically speaking it is a metalloid halide.

The reaction will take place at temperatures ranging from about 0° to about 200° C. or more, the particular temperature used being dependent upon the particular aromatic compound and upon the catalyst present in the reaction mixture. In addition, if so desired, the reaction may be effected at pressures ranging from about atmospheric to about 100 atmospheres or more, the pressure being sufficient to maintain at least a portion of the reactants in the liquid phase. The imine hydrochloride which results from the reaction between the aromatic compound and the nitrile is subjected to hydrolysis by treating said imine hydrochloride with a basic compound to thus prepare the desired aromatic ketone. Basic compounds which may be used include the hydroxides and carbonates of the alkali metals and alkaline earth metals such as sodium hydroxide, potassium hydroxide, lithium hydroxide, cesium hydroxide, rubidium hydroxide, magnesium hydroxide, calcium hydroxide, strontium hydroxide, barium hydroxide, sodium carbonate, potassium carbonate, lithium carbonate, rubidium carbonate, cesium carbonate, strontium carbonate, calcium carbonate, barium carbonate. The hydrolysis step is also carried out at elevated temperatures ranging from about 50° to about 100° C., the preferred range being from about 90° to about 100° C. Lower temperatures may also sometimes be employed.

The process of the present invention may be effected in any suitable manner and may comprise either a batch or a continuous operation. For example, when a batch type operation is used a quantity of the aromatic compound and the nitrile is placed in an appropriate apparatus such as a roating autoclave along with the Friedel-Crafts type catalyst. The autoclave is sealed, the anhydrous hydrogen chloride is pressured in and the apparatus is heated to the desired temperature. After a predetermined residence time has elapsed the autoclave and contents thereof are cooled to room temperature and the reaction product, comprising the desired imine hydrochloride is separated from unreacted starting materials by conventional means and placed in a second reactor. The desired basic compound such as, for example, sodium hydroxide, is also placed in the vessel and the mixture heated to the desired temperature. Upon completion of the second residence time the reactor and contents thereof are cooled to room temperature and the desired aromatic ketone is recovered by conventional means such as, for example, fractional distillation under reduced pressure, etc.

The process of the present invention may also be effected in a continuous type operation. One such type of operation comprises a fixed bed method in which the catalyst comprising a Friedel-Crafts type metal halide is disposed as a fixed bed in the reaction zone. The reaction zone which may comprise an unpacked vessel or coil, or which may be lined with an adsorbent packing material such as fire brick, alumina, dehydrated bauxite and the like is maintained at the proper operating conditions of temperature and pressure. The starting materials comprising the aromatic compound and the nitrile are continuously charged to the reaction zone through separate lines or, if so desired, they may be admixed prior to entry and charged thereto in a single stream. Anhydrous hydrogen chloride is also continuously charged to the zone through separate means. Upon completion of the desired residence time the reaction product is continuously withdrawn, separated from the reactor effluent, the latter being recycled to form a portion of the feed stock, and continuously charged to a second reaction zone where it undergoes hydrolysis by contact with a basic compound such as, for example, sodium hydroxide, potassium hydroxide, etc. After hydrolysis the desired aromatic ketone is continuously withdrawn from the second reaction zone and purified by conventional means hereinbefore set forth.

It is also contemplated within the scope of this invention that other continuous types of operation may be used such as, for example, the moving bed type in which the catalyst bed and the reactants are passed through the reaction zone either concurrently or countercurrently to each other and the slurry type process in which the catalyst is carried into the reaction zone as a slurry in either the aromatic compound or in the nitrile. In both of the latter two processes as in the first named process the reaction products from the first and second reactor are separated from the reactor effluent, the latter being recycled to form a portion of the feed stock in both instances, while the desired product is withdrawn and purified.

The following examples are given to illustrate the process of the present invention, which, however, are not intended to limit the generally broad scope of the present invention in strict accordance therewith.

*Example I*

Forty-three grams of toluene and 18 g. of acetonitrile were placed in a glass liner of a rotating autoclave along with 30 g. of aluminum chloride. The liner was placed in the autoclave, sealed, anhydrous hydrogen chloride was pressured in, and the apparatus was heated to a temperature of about 150° C. and maintained thereat for a period of about 1.5 hours. At the end of this time the autoclave and contents thereof were cooled to room temperature and the intermediate imine hydrochloride was recovered.

The imine salt was hydrolyzed by placing it in a flask and adding dilute (20%) sodium hydroxide until strongly basic. The flask was then heated to a temperature of about 100° C. and maintained thereat for a period of about 20 minutes. At the end of this time the flask and contents thereof were cooled to room temperature and the desired ketone, comprising 4'-methylacetophenone was separated from the unreacted materials, extracted with ether and dried, the yield being 3 g.

*Example II*

Forty-seven grams of ortho-xylene and 18 g. of acetonitrile were placed in a glass liner of a rotating autoclave along with 30 g. of aluminum chloride. The liner was placed in the autoclave and sealed, after which 26 atmospheres of anhydrous hydrogen chloride was pressured in. The autoclave was heated to a temperature of about 150° C. and maintained thereat for a period of about 1.5 hours. At the end of this time the autoclave and contents thereof were cooled to room temperature and the excess pressure was vented. The intermediate imine hydrochloride was separated from the unreacted starting materials by conventional means and hydrolyzed by treating with dilute (20%) sodium hydroxide. The flask was heated to a temperature of about 100° C. and maintained thereat for approximately 20 minutes. At the end of this time the flask was cooled to room temperature and the reaction mixture extracted with ether, washed and dried. The desired product, comprising 4 g. of 3',4'-dimethylacetophenone was separated and recovered.

*Example III*

A mixture of toluene and propionitrile is reacted in the presence of aluminum chloride and anhydrous hydrogen chloride in a manner similar to that set forth in Examples I and II above. The resultant imine hydrochloride is hydrolyzed by treating with barium hydroxide in a manner also similar to that set forth above and the resultant 4'-methylpropiophenone is separated and recovered.

*Example IV*

A mixture of o-xylene and propionitrile is heated to a temperature of about 150° C. in the presence of aluminum chloride and anhydrous hydrogen chloride. The resultant imine hydrochloride is hydrolyzed by treating with magnesium hydroxide and the resultant 3',4'-dimethylpropiophenone is separated and recovered.

I claim as my invention:

1. A process for the preparation of an aromatic ketone which comprises reacting a lower alkyl benzene hydrocarbon with an alkane nitrile in the presence of a Friedel-Crafts catalyst and anhydrous hydrogen chloride, hydrolyzing the resultant compound, and recovering the resultant alkyl phenyl ketone.

2. A process for the preparation of an aromatic ketone which comprises reacting a lower alkyl benzene hydrocarbon with an alkane nitrile in the presence of a Friedel-Crafts catalyst and anhydrous hydrogen chloride at a temperature in the range of from about 0° to about 200° C., treating the resultant compound with a basic compound selected from the group consisting of the hydroxides and carbonates of the alkali metals and alkaline earth metals, and recovering the resultant alkyll phenyl ketone.

3. A process for the preparation of an aromatic ketone which comprises reacting a lower alkyl benzene hydrocarbon with an alkane nitrile in the presence of aluminum chloride and anhydrous hydrogen chloride at a temperature in the range of from about 0° to about 200° C., hydrolyzing the resultant imine hydrochloride, and recovering the resultant alkyl phenyl ketone.

4. A process for the preparation of an aromatic ketone which comprises reacting o-xylene with an alkane nitrile in the presence of aluminum chloride and anhydrous hydrogen chloride at a temperature in the range of from about 0° to about 150° C., hydrolyzing the resultant imine hydrochloride, and recovering the resultant dimethyl phenyl ketone.

5. A process for the preparation of an aromatic ketone which comprises reacting toluene with an alkane nitrile in the presence of aluminum chloride and anhydrous hydrogen chloride at a temperature in the range of from about 0° to about 150° C., hydrolyzing the resultant imine hydrochloride, and recovering the resultant methyl phenyl ketone.

6. A process for the preparation of an aromatic ketone which comprises reacting a lower alkyl benzene hydrocarbon with propionitrile in the presence of a Friedel-Crafts catalyst and anhydrous hydrogen chloride at a temperature in the range of from about 0° to about 200° C., hydrolyzing the resultant imine hydrochloride, and recovering the resultant alkyl propiophenone.

7. A process for the preparation of an aromatic ketone which comprises reacting toluene with acetonitrile in the presence of aluminum chloride and anhydrous hydrogen chloride at a temperature in the range of from about 0° to about 200° C., hydrolyzing the resultant imine hydrochloride with sodium hydroxide, and recovering the resultant 4'-methylacetophenone.

8. A process for the preparation of an aromatic ketone which comprises reacting o-xylene with acetonitrile in the presence of aluminum chloride and anhydrous hydrogen chloride at a temperature in the range of from about 0° to about 200° C., hydrolyzing the resultant imine hydrochloride with potassium hydroxide, and recovering the resultant 3',4'-dimethylacetophenone.

9. A process for the preparation of an aromatic ketone which comprises reacting toluene with propionitrile in the presence of aluminum chloride and anhydrous hydrogen chloride at a temperature in the range of from about 0° to about 200° C., hydrolyzing the resultant imine hydrochloride with barium hydroxide, and recovering the resultant 4'-methylpropiophenone.

10. A process for the preparation of an aromatic ketone which comprises reacting o-xylene with propionitrile in the presence of aluminum chloride and anhydrous hydrogen chloride at a temperature in the range of from about 0° to about 200° C., hydrolyzing the resultant imine hydrochloride with magnesium hydroxide, and recovering the resultant 3',4'-dimethylpropiophenone.

References Cited in the file of this patent

Adams et al.: Organic Reactions, vol. V, pp. 388–400 (1949).